(12) United States Patent
Graef et al.

(10) Patent No.: US 11,592,134 B2
(45) Date of Patent: Feb. 28, 2023

(54) APPARATUS FOR SPREADING FLUIDS AND IN PARTICULAR FERTILIZERS, PESTICIDES AND SIMILAR

(71) Applicant: agrotop GmbH, Obertraubling (DE)

(72) Inventors: Steffen Graef, Obertraubling (DE); Thomas Schenk, Neuffen (DE); Franz Renner, Obertraubling (DE)

(73) Assignee: agrotop GmbH

( * ) Notice: Subject to any disclaimer, the term of this patent is extended or adjusted under 35 U.S.C. 154(b) by 61 days.

(21) Appl. No.: 16/212,196

(22) Filed: Dec. 6, 2018

(65) Prior Publication Data

US 2019/0170282 A1 Jun. 6, 2019

(30) Foreign Application Priority Data

Dec. 6, 2017 (DE) ..................... 10 2017 129 007.9

(51) Int. Cl.
*A01M 7/00* (2006.01)
*F16L 41/06* (2006.01)
*B05B 15/658* (2018.01)
*B05B 1/30* (2006.01)

(52) U.S. Cl.
CPC ............. *F16L 41/06* (2013.01); *A01M 7/006* (2013.01); *B05B 15/658* (2018.02); *B05B 1/3006* (2013.01)

(58) Field of Classification Search
CPC ...... F16L 41/06; B05B 15/658; B05B 1/3006; A01M 7/006; A01M 7/005–006
See application file for complete search history.

(56) References Cited

U.S. PATENT DOCUMENTS

| 3,117,725 A | * | 1/1964 | Palmer | A01M 7/006 239/168 |
| 3,478,967 A | * | 11/1969 | Horton | A01M 7/006 239/176 |
| 3,515,349 A | * | 6/1970 | Mecklin | A01M 7/005 239/169 |
| 4,736,888 A | * | 4/1988 | Fasnacht | A01M 7/005 239/161 |
| 4,915,305 A | * | 4/1990 | O'Brien | B05B 15/658 239/550 |

(Continued)

FOREIGN PATENT DOCUMENTS

| DE | 196 15 205 | 10/1996 | ................ F16B 7/08 |
| DE | 60111635 | 5/2006 | ............. A21D 10/00 |

(Continued)

OTHER PUBLICATIONS

German Office Action (w/machine translation) issued in application No. 10 2017 129 007.9, dated Oct. 24, 2018 (6 pgs).

(Continued)

*Primary Examiner* — Joseph A Greenlund
(74) *Attorney, Agent, or Firm* — Hayes Soloway P.C.

(57) ABSTRACT

Apparatus for spreading fluids and in particular fertilizers, pesticides and similar fluids, with a connection for attaching said apparatus to a machine, with a tubular body for conducting the fluid, and with a first outlet device via which the fluid can be discharged. The outlet device can be fixed at various positions in a longitudinal direction of the tubular body such that a position of the outlet device can be selected relative to the tubular body.

19 Claims, 2 Drawing Sheets

(56) References Cited

U.S. PATENT DOCUMENTS

| | | | | |
|---|---|---|---|---|
| 5,143,298 | A | * | 9/1992 | Prokopoff ............. B05B 15/654 239/494 |
| 5,697,650 | A | * | 12/1997 | Brown ..................... F16L 41/12 411/537 |
| 6,152,388 | A | * | 11/2000 | Rohloff ................. B05B 15/658 239/600 |
| 6,902,201 | B1 | * | 6/2005 | Helle ...................... F16L 41/06 137/317 |
| 7,861,946 | B2 | * | 1/2011 | Beeren .................. B05B 1/1645 239/170 |
| 9,140,398 | B2 | * | 9/2015 | Lang ..................... F16L 21/065 |
| 10,018,291 | B2 | * | 7/2018 | Lang ..................... B05B 1/1645 |
| 10,076,075 | B1 | * | 9/2018 | Muff ..................... A01C 23/027 |
| 10,159,178 | B2 | * | 12/2018 | Muff ..................... A01G 25/09 |
| 10,455,824 | B2 | * | 10/2019 | Lawrence ............. A01C 23/008 |
| 10,849,319 | B2 | * | 12/2020 | Dahlhauser ......... A01M 7/0042 |
| 2002/0190140 | A1 | * | 12/2002 | Arenson ............... B05B 1/3006 239/391 |
| 2011/0240143 | A1 | * | 10/2011 | Lang ..................... B05B 15/658 137/561 A |
| 2012/0132730 | A1 | * | 5/2012 | Peterson ............... A01M 7/006 239/738 |
| 2015/0289443 | A1 | * | 10/2015 | Garuti .................. B05B 15/658 239/444 |
| 2016/0120117 | A1 | | 5/2016 | Lawrence et al. ...... A01C 23/00 |
| 2017/0049043 | A1 | * | 2/2017 | Muff ......................... B05B 1/20 |
| 2017/0354137 | A1 | * | 12/2017 | Dahlhauser ......... A01M 7/0064 |
| 2018/0206474 | A1 | * | 7/2018 | Vaughan .............. A01M 7/0071 |
| 2018/0281009 | A1 | * | 10/2018 | Boughton .............. A01G 25/02 |
| 2018/0368387 | A1 | * | 12/2018 | Welte .................... A01C 23/047 |
| 2019/0151881 | A1 | * | 5/2019 | O'Connell ............ B05B 15/658 |
| 2019/0170282 | A1 | * | 6/2019 | Graef .................... B05B 15/658 |

FOREIGN PATENT DOCUMENTS

| | | | |
|---|---|---|---|
| DE | 10 2007 017 315 | 10/2008 | ............. A01M 7/00 |
| EP | 1418378 | 5/2004 | ................ B26F 1/00 |
| EP | 2 957 346 | 12/2015 | ............. B05B 1/08 |
| EP | 3 090 630 | 11/2016 | ............. A01M 7/00 |
| GB | 733236 | 7/1955 | |
| GB | 2 229 074 | 9/1990 | ............. A01M 7/00 |
| WO | WO2014/159119 | 10/2014 | ............. A01M 7/00 |

OTHER PUBLICATIONS

European Official Action (w/machine translation) issued in application No. 18210322.6, dated May 2, 2019 (21 pgs).

European Intent to Grant (w/machine translation) issued in application No. 18210322.6, dated May 25, 2020 (15 pgs).

German Office Action issued in German Patent Appln. Serial No. 10 2017 129 007.9, dated Jun. 2, 2021, with machine English translation, 12 pages.

Notice of Opposition issued in European Patent Appln. Serial No. 18210322.6-1005, dated Aug. 12, 2021, with machine translation, 34 pages.

Flugschrift "Dropleg-Applikationstechnik fuer zielgerichteten Pflanzenschutz in Reihenkulturen" Jacob Ruegg und Rene Total, Bundesamt fuer Landwirtschaft, Schweizerische Eidgenossenschaft, Oct. 2013, 27 pages.

"Dropleg-Applikationstechnik fuer zielgerichteten Pflanzenschutz in Reihenkulturen: Einfuehrung und Hinweise fuer Produzenten und Berater" Agroscope webpage, accessed Jul. 26, 2021, 1 page.

"Impressum" Agroscope Contact webpage, accessed Jul. 26, 2021, 2 pages.

Klmag.ch webpage, www.archive.org, Oct. 11, 2016, 2 pages.

"Dropleg-Technik", Schweizer Bauer Dossier, Mar. 15, 2014, 3 pages.

* cited by examiner

APPARATUS FOR SPREADING FLUIDS AND IN PARTICULAR FERTILIZERS, PESTICIDES AND SIMILAR

BACKGROUND OF THE INVENTION

The present invention relates to an apparatus for spreading fluids and in particular fertilisers, pesticides, herbicides, fungicides and similar. The present invention thus relates in particular to the agricultural sector. In the prior art, it has been known for a long time to apply fluids, such as for example fertilisers, pesticides, herbicides and fungicides, mechanically. It is known that corresponding spreading machines have booms on which pipes are arranged in a hanging and/or dragging manner, wherein these pipes have an outlet opening at the end via which the respective fluid can be applied to a target area such as a field. These pipes are sometimes known as drag pipes.

These spreader units must be relatively robust since spreading or application usually takes place on relatively difficult terrain. These spreader means may be damaged, for example due to unevenness in the ground and similar.

A further problem is that, dependently of the respective good to be treated, for example a plant species, the fluid must be applied in different regions. Thus it is possible for example that a pesticide must be spread onto a stem or also onto leaves of the respective crop. The spreader means known from the prior art do not allow such variability in the application position.

SUMMARY OF THE INVENTION

The present invention is therefore based on the object of providing an apparatus for spreading such fluids which can be adapted to different plant species.

An apparatus according to the invention for spreading fluids and in particular fertilizers, pesticides and similar, has a connection for attaching said apparatus to a machine. In addition, the apparatus has a tubular body for conducting the fluid, and an outlet device via which the fluid can be discharged.

According to the invention, the outlet device can be fixed at various positions in a longitudinal direction of the tubular body such that a position of the outlet device relative to the tubular body can be selected. Since the apparatus is normally used in a substantially vertical orientation, this position determination also allows determination of the height at which the outlet device is arranged. In contrast, apparatus known from the prior art usually have an opening at the end, so that the delivery height is already established by the length of the apparatus. In the context of the invention is therefore proposed that the outlet device is substantially not necessarily arranged at the end, but in particular lies on an outer periphery of the tubular body.

The machine may in particular be an agricultural machine. Preferably, the connection is configured such that it can be separated from the machine, for example to exchange said apparatus for another apparatus.

In a preferred embodiment, the machine may comprise a carrier on which a plurality of the devices described here may be arranged. This carrier may extend preferably transversely to a direction of travel of the machine. In a further advantageous embodiment, it is therefore possible that the ends of the apparatus are brought relatively close to a ground to be processed or treated, or to a crop to be treated.

In a further preferred embodiment, a further in particular flexible body is arranged between the connection and the tubular body and also serves to conduct the fluid. This flexible body may therefore be designed for example as a hose which is preferably arranged both at the connection and also at the tubular body. Here, it is possible that this flexible body is attached to the connection, in particular but not exclusively via a connecting mechanism such as a pipe clamp. In addition, this flexible body may also be arranged on the tubular body with a further connection mechanism, such as in particular a pipe clamp.

In a further preferred embodiment, the flexible body may also be configured as a hose with a spring device arranged on its outer periphery. This spring device may cause a desired flexibility of the flexible body. In a further preferred embodiment, the connection is a bayonet-type connection which in particular may be attached to the outlet manually. This allows rapid change of the individual spreading apparatus or delivery device.

In a further preferred embodiment, at least one opening, through which the fluid can emerge, is arranged in a peripheral wall of the tubular body. In particular, in this case the fluid may emerge towards the outlet device. Thus it is possible that the user creates, for example drills, an opening at a specific height and the outlet device is attached to this opening. By selecting the height position of this opening, the position of the outlet device may be determined and with it the height or height range at which the fluid is discharged.

In a further advantageous embodiment, the outlet device may be attached to the tubular body by means of a clamping mechanism and/or bracket mechanism. Thus for example the outlet device may be clamped directly to the opening in the peripheral wall of the tubular body. In this way, the fluid can enter the outlet device through the opening in the peripheral body or tubular body. In a preferred embodiment, the outlet device may be attached in a sealed manner to the tubular body.

In a further advantageous embodiment, the outlet device comprises a carrier, wherein this carrier has at least a first carrier part and a second carrier part which can be fixed to each other and to the tubular body. Preferably, the first and second carrier parts are configured such that they can receive the tubular body between them. Advantageously, a connecting device is furthermore provided to connect the two carrier parts together. Thus for example one or two screw connections may be provided, by means of which the two carrier parts can be attached around the tubular body. By tightening this screw connection, the outlet device may be secured to the tubular body.

Advantageously, the tubular body has a circular cross-section. In a preferred embodiment, one of the two carrier parts, and preferably both carrier parts, may also have a circular or cylindrical or semicylindrical or semicircular recess in which components of the tubular body may be placed.

In a further preferred embodiment, the tubular body is made from a plastic. Particularly preferably, the tubular body is configured so as to be flexible.

In a further advantageous embodiment, at least one of the two carrier parts, and preferably both carrier parts, is/are made from a plastic.

In a further advantageous embodiment, the outlet device comprises at least one nozzle device, wherein this nozzle device is preferably arranged releasably on a carrier of the outlet device. Thus the outlet device may have a recess in which a nozzle device may be inserted.

This nozzle device too may be arranged on a carrier, and this carrier may in turn be inserted in the outlet device. Preferably, the nozzle device is Inserted in a recess.

In a further advantageous embodiment, sealing devices are provided for sealing the nozzle device against the outlet carrier. Thus for example, the nozzle device may have a sealing means, such as in particular but not exclusively an O-ring, by means of which the nozzle device can be sealed against the outlet device.

In a further advantageous embodiment, the nozzle device is a nozzle device which allows an even application. In particular, the nozzle device allows spreading or delivery of the fluid with a predefined spread direction in a longitudinal direction of the tubular body. Thus for example a spread angle can be achieved of at least 10°, preferably of at least 20°, preferably of at least 30° and particular preferably of at least 40°. In this way, even a heavy application is possible in a longitudinal direction of the tubular carrier and particularly preferably also in a height direction of the crop to be treated.

In a further advantageous embodiment, the outlet device comprises at least two nozzle devices which are arranged on the carrier and/or on the outlet device. Here it is possible that the two nozzle devices deliver in different directions, for example in two different directions in a direction perpendicular to the vertical or height direction. Thus for example the two nozzle devices may spread or deliver the fluid to the left and right relative to a direction of travel of a spreading machine.

In a further advantageous embodiment, the nozzle devices thus deliver in different directions.

In a preferred embodiment, a channel is provided in the carrier which serves to conduct the medium or fluid. Preferably, in a mounted state this channel extends in a radial direction with respect to the tubular body or in a direction which stands perpendicularly to the tubular body or its longitudinal direction.

In a further advantageous embodiment, this channel constitutes a fluidic connection to an opening which is situated in the peripheral wall of the tubular body.

In a further preferred embodiment, at least two branches branch off said channel in the direction of the respective nozzle devices. Preferably, a sealing device is provided for sealing said channel against the wall of the tubular body. This sealing device may also be an O-ring.

Here it is possible that this sealing device is part of the nozzle device, such as an O-ring, which may be inserted in a groove of the nozzle device. In addition, the nozzle device may preferably be laid in the carrier and positioned relative thereto in a direction which extends parallel to a plane which is determined or spanned by the sealing device.

In addition, a starting portion of this channel may be configured such that it is adapted geometrically to the shape of the tubular body for example to the curvature of its peripheral wall.

In a further advantageous embodiment, the holes in the peripheral wall of the tubular body are adapted to a cross-section of the channel. In this way, changes in fluidic cross-section between the opening in the tubular body and the channel may be avoided.

In a further advantageous embodiment, the outlet device may be attached to an opening arranged in one of the peripheral forms of the tubular body. In this way, as stated above, the fluidic connection for the fluid is created.

In a further advantageous embodiment, the tubular body comprises a second outlet device or outlet opening for the fluid, in particular at the end. In this way, if necessary, the fluid can be delivered not only via the outlet device but also directly or indirectly via an end opening of the tubular body. Thus it would also be possible to provide a second outlet device which in particular is mounted on the end of the tubular body. In this way, the fluid can be delivered at several heights relative to the longitudinal direction of the tubular body. Here it would also be possible for openings in the peripheral wall and an end opening of the tubular body to be matched to each other such that the respective desired quantity ratios of fluid can emerge from the tubular body.

In addition, the spreading apparatus may also comprise several outlet devices of the type described above, which in particular are arranged on the same tubular body but at different heights.

In a further advantageous embodiment, the outlet device has, at least in sections, a curved outer surface. This curved outer surface allows the outlet device to be guided more easily through the good to be treated during use and reduces the risk of catching. Thus the outlet device as a whole preferably has an egg-shaped structure.

Preferably, the outlet device is designed such that it is symmetrical in a state mounted in the tubular body, in particular symmetrical relative to a plane which extends in the longitudinal direction of the tubular body.

In a further advantageous embodiment, the tubular body is arranged on a holding device. It is conceivable that the tubular body is inserted in a portion of this holding device and in particular in a sleeve-like portion of this holding device. The tubular body may here for example be attached to and/or held on the sleeve-like portion via holding means such as grub screws. In addition, it would also be conceivable that the tubular body is cast with the sleeve-like portion or formed integrally therewith.

In a further advantageous embodiment, this holding device is preferably arranged pivotably on a carrier. This carrier may be part of the apparatus described herein, but could also be a carrier which is formed by a part of a further machine such as a machine frame.

In a further advantageous embodiment, the holding device may be released from the carrier in a (pivot) position of the holding device with respect to the carrier. Preferably, this is a pivot position which deviates from a pivot position in working operation. Thus it would be possible for the operator to pivot the holding device into this pivot position relative to the carrier and then remove it. Preferably, in other pivot positions of the holding device relative to the carrier, and in particular in pivot positions which are assumed during working operation, release of the holding device from the carrier is not possible.

Thus a protrusion could be formed on the holding device or on the carrier which cooperates with a recess formed on the carrier or the holding device. This protrusion could engage behind the carrier in a plurality of pivot positions and only be able to be guided through the recess in one pivot position, wherein then in this position the holding device can be released from the carrier.

BRIEF DESCRIPTION OF THE DRAWINGS

Further advantages and embodiments arise from the attached drawings.

The drawings show.

DETAILED DESCRIPTION OF THE INVENTION

Figure 1:
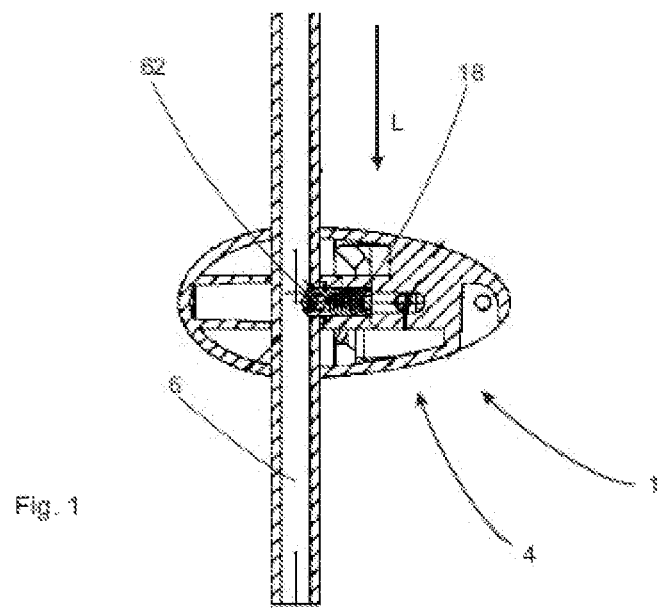
FIG. 1 a diagrammatic, detailed depiction of an apparatus for spreading fluids.

FIG. 1 shows a partial, sectional depiction of an apparatus 1 according to the invention. This has a tubular body 6 which serves to conduct a fluid, for example a pesticide. This tubular body 6 has a side opening 62 through which a fluid medium can pass into an outlet device, designated as a whole with numeral 4. Reference sign L designates a longitudinal direction of the tubular body.

The outlet device described in more detail below comprises a spring device 18 which may for example preload a nonreturn valve. In this way, it is possible that fluid can only emerge from the outlet device above a specific pressure.

Figure 2:
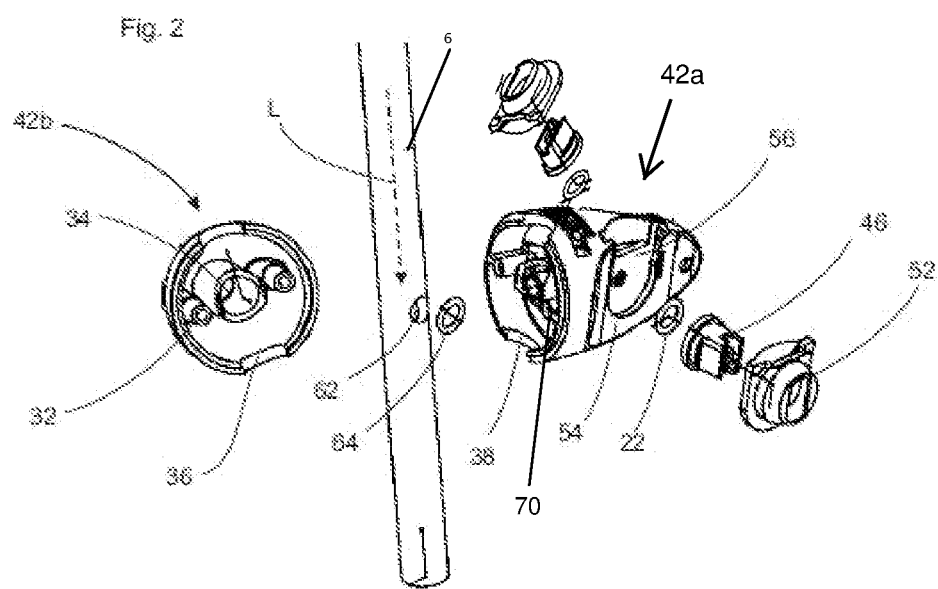
FIG. 2 an exploded view of the apparatus shown in FIG. 1.

FIG. 2 shows an exploded depiction of the apparatus shown in FIG. 1, it is clear that the outlet device has a clamping mechanism which allows the outlet device 4 to be clamped to the tubular body 6. To this end, the clamping mechanism comprises a first clamping part 42a and a second clamping part 42b. These may be arranged around the tubular body 6 and screwed together so that as a whole the outlet device 4 is attached to the rod-like body 6. The first clamping body 42a has a recess 38, and the second clamping body 42b has a recess 36, which together at least partially surround the tubular body 6. Reference sign 32 designates seats for the screw bodies which may be introduced from the outside in order to screw the two clamping bodies 42a and 42b together.

Reference sign 34 designates a contact portion which in a mounted state presses against the tubular body 6. Reference sign 64 designates a sealing device by means of which a seal may be created between the clamping body 42a and the tubular body 6. Reference sign 54 designates a carrier which serves to receive a nozzle device 46 and an auxiliary nozzle portion 52. Reference sign 56 designates a seat in which the nozzle device 46 may be inserted.

Figures 3, 4:
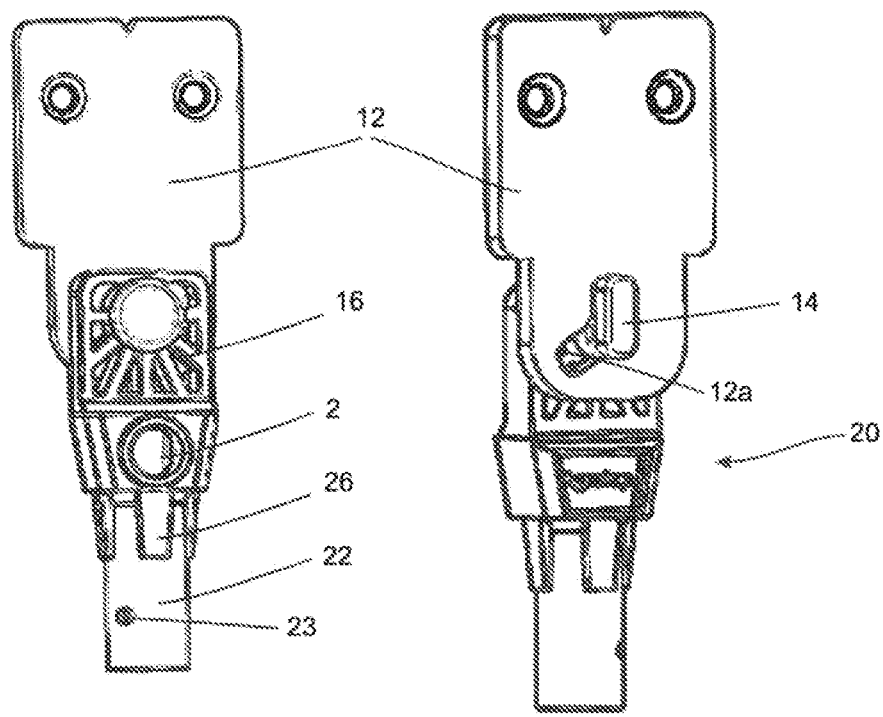
FIG. 3-5 three depictions of a fixing device.
Figure 5:
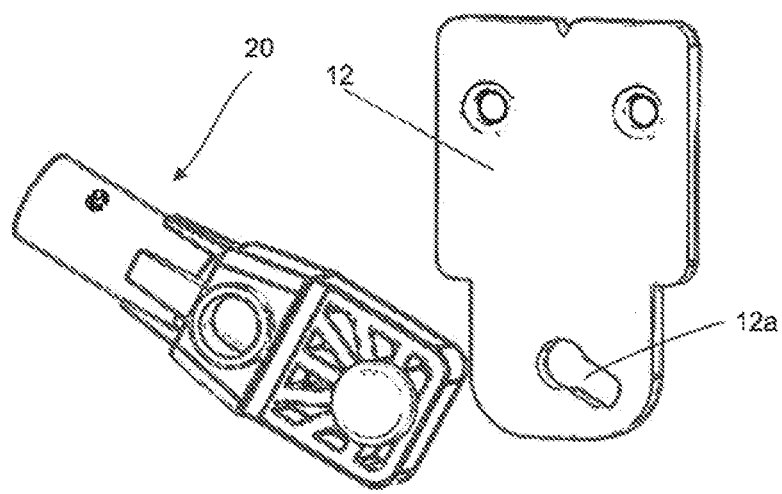

FIGS. 3 to 5 show the fixing mechanism by which the apparatus may be arranged on a vehicle. A carrier 12 is provided, which for example can be bolted to a region of the vehicle. Reference sign 20 designates a holding device which serves to hold the tubular body 6. To this end, this holding device has a sleeve 22 which is suitable and intended for receiving the tubular body 6. The tubular body may be inserted in this sleeve and be screwed thereto, e.g. via a screw connection 23. It would however also be possible for the tubular body to be pressed into or engage in the sleeve 22.

Reference sign 2 designates a supply line via which a fluid medium may be supplied to the tubular body 6. Reference sign 16 designates reinforcing webs. Reference sign 26 designates a pivot element for pivoting the holding device 20 relative to the carrier 12. A flexible body such as a hose 70 is arranged between the connection and the tubular body to conduct the fluid.

Reference sign 14 designates an elongate protrusion which is formed integrally on the holding device 20 and which, in a predefined pivot position, can be guided through an opening or receiving groove 12a formed in the carrier 12.

FIG. 5 shows an exploded view, wherein again the carrier 12 is depicted and also a receiving groove 12a in order to receive the element 16 in a pivotable manner. In the position shown in FIG. 5, the protrusion 14 and the receiving groove 12a run parallel to each other, so that in this position the holding device 20 may be removed from the carrier. The protrusion 14 is preferably arranged on a circular bolt.

The position shown in FIG. 5 is therefore a position which is not assumed in a working operation of the apparatus according to the invention. The user may however pivot the tubular body into the position shown in FIG. 5 and then remove the holding device 20 from the carrier 12.

Alternatively, as shown in FIG. 2, the outlet device may comprise a second sleeve, nozzle device and auxiliary nozzle portion.

The applicant reserves the right to claim all features disclosed in the application documents as essential to the invention where novel individually or in combination relative to the prior art. It is furthermore pointed out that in the individual figures, features have been described which may be advantageous in themselves. The person skilled in the art will immediately gather that a specific feature described in one figure may also be advantageous without the transfer of further features this figure. The person skilled in the art will furthermore gather that advantages may result from a combination of several features shown in individual or in different figures.

LIST OF REFERENCE SIGNS 1 apparatus
2 supply line
4 outlet device
6 tubular body
12 carrier
16 pivot element
18 spring device
20 holding device
22 sleeve
23 screw device
26 reinforcing webs
32 seat for screw body
34 contact portion
36 recess of second clamping body
38 recess of first clamping body
46 nozzle device
52 auxiliary nozzle portion
54 carrier
56 seat
62 side opening of the tubular body
64 sealing device
12a receiving groove
42a first clamping part
42b second clamping part
70 hose or flexible body

The invention claimed is:

1. An apparatus for spreading a fluid on the ground, said apparatus having a connection for attaching said apparatus to a machine, with a tubular body configured for conducting the fluid, and with a first outlet device via which the fluid can be discharged,
  wherein the tubular body of the apparatus is formed from a plastic material and is oriented in a substantially vertical orientation and is configured to permit the first outlet device to be arranged at different vertical heights,
  wherein the first outlet device comprises a carrier,
  wherein the carrier has at least a first carrier part and a second carrier part which are configured to be fixed to each other with the tubular body therebetween,
  wherein at least one opening, through which the fluid can flow to the first outlet device, is arranged in a circumferential wall of the tubular body and the first outlet device is configured to be fixed at various positions in a longitudinal direction of the tubular body such that a position of the outlet device relative to the tubular body can be selected,
  wherein the position of the outlet device relative to the tubular body also fixes the height of the first outlet device relative to the ground wherein the connection for attaching said apparatus to a machine comprises a third carrier, a holding device configured to hold the tubular body and a pivot element configured for pivoting the holding device relative to the third carrier, wherein the tubular body is pivotable from a first position which is assumed in a working operation of the apparatus to a second position which is not assumed in a working operation of the apparatus, and wherein in the second position the holding device is removable from the third carrier.

2. The apparatus according to claim 1, wherein the outlet device is configured to be attached to the tubular body by a clamp.

3. The apparatus according to claim 1 wherein the first outlet device comprises at least one nozzle device.

4. The apparatus according to claim 3, wherein the first outlet device is configured to be placed on an opening arranged in the circumferential wall of the tubular body.

5. The apparatus according to claim 3, wherein the tubular body is flexible.

6. The apparatus according to claim 3, wherein the nozzle device is arranged releasably on a carrier of the first outlet device.

7. The apparatus according to claim 3, wherein the fluid comprise fertilizers or pesticides.

8. The apparatus according to claim 1 wherein the first outlet device comprises at least two nozzle devices which are arranged on a carrier.

9. The apparatus according to claim 1, comprising a second outlet device, wherein the tubular body comprises a second end-mounted outlet device for the fluid configured such that the fluid can be delivered through the first and second outlet device at different heights relative to the longitudinal direction of the tubular body.

10. The apparatus according to claim 1, wherein the first outlet device has, at least in sections, a curved outer surface.

11. The apparatus according to claim 10, wherein the first outlet device has an egg-shaped structure.

12. The apparatus according to claim 1, wherein the tubular body is arranged on a holding device and the holding device is arranged pivotably on a carrier, wherein the holding device can be released from the carrier in a pivot position of the holding device with respect to the carrier.

13. The apparatus according to claim 1, wherein a flexible body is arranged between the connection and the tubular body and also serves to conduct the fluid.

14. The apparatus according to claim 13, wherein the flexible body comprises a hose which is arranged both at the connection and also at the tubular body.

15. The apparatus according to claim 1, wherein a flexible body is arranged between the connection and the tubular body and also serves to conduct the fluid and wherein the flexible body is configured as a hose with a spring device arranged on an outer periphery of the hose.

16. The apparatus according to claim 1, wherein the outlet device comprises at least one nozzle device, wherein the nozzle device is releasably arranged on the carrier of the outlet device and wherein the outlet device has a recess, in which the nozzle device may be inserted.

17. The apparatus according to claim 16, wherein the nozzle device is configured to allow spreading of the fluid with a predefined spread direction in a longitudinal direction of the tubular body, wherein an spread angle of at least 20° can be achieved.

18. An apparatus for spreading a fluid on the ground, said apparatus having a connection for attaching said apparatus to a machine, with a tubular body configured for conducting the fluid, and with a first outlet device via which the fluid can be discharged, wherein the tubular body of the apparatus is flexible and oriented in a substantially vertical orientation and is configured to permit the first outlet device to be arranged at different vertical heights, wherein at least one opening, through which the fluid can flow to the first outlet device, is arranged in a circumferential wall of the tubular body and the first outlet device comprises a carrier, wherein the carrier has at least a first carrier part and a second carrier part which can be fixed to each other and to the tubular body, wherein the first carrier part and the second carrier part are configured such that they can receive the tubular body between them to be fixed at various positions in a longitudinal direction of the tubular body such that a position of the outlet device relative to the tubular body can be selected, wherein the position of the outlet device relative to the tubular body also fixes the height of the first outlet device relative to the ground, wherein the connection for attaching said apparatus to a machine comprises a third carrier, a holding device configured to hold the tubular body and a pivot element configured for pivoting the holding device relative to the third carrier, wherein the tubular body is pivotable from a first position which is assumed in a working operation of the apparatus to a second position which is not assumed in a working operation of the apparatus, and wherein in the second position the holding device is removable from the third carrier.

19. An apparatus for spreading a fluid on the ground, said apparatus having a connection for attaching said apparatus to a machine, with a tubular body configured for conducting the fluid, and with a first outlet device via which the fluid can be discharged, wherein the tubular body of the apparatus is oriented in a substantially vertical orientation and is configured to permit the first outlet device to be arranged at different vertical heights, wherein at least one opening, through which the fluid can flow to the first outlet device, is arranged in a circumferential wall of the tubular body and the first outlet device comprises a carrier, wherein this carrier has, at least in sections, a curved outer surface and has an egg-shaped structure, wherein at least a first carrier part and a second carrier part can be fixed to each other and to the tubular body, wherein the first carrier part and the second carrier part are configured such that they can receive the tubular body between them to be fixed at various positions in a longitudinal direction of the tubular body such that a position of the outlet device relative to the tubular body also fixes the height of the first outlet device relative to the ground, wherein the connection for attaching said apparatus to a machine comprises a third carrier, a holding device configured to hold the tubular body and a pivot element configured for pivoting the holding device relative to the third carrier, wherein the tubular body is pivotable from a first position which is assumed in a working operation of the apparatus to a second position which is not assumed in a working operation of the apparatus, and wherein in the second position the holding device is removable from the third carrier.

* * * * *